United States Patent
He et al.

(10) Patent No.: US 11,089,102 B2
(45) Date of Patent: Aug. 10, 2021

(54) ADVERTISING NETWORK RESOURCE SHARING STATUS IN SDN

(71) Applicant: Telefonaktiebolaget LM Ericsson (publ), Stockholm (SE)

(72) Inventors: Jiang He, Beijing (CN); Ke Yi, Beijing (CN); Bolin Nie, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 457 days.

(21) Appl. No.: 16/070,903

(22) PCT Filed: Jan. 20, 2016

(86) PCT No.: PCT/CN2016/071466
§ 371 (c)(1),
(2) Date: Jul. 18, 2018

(87) PCT Pub. No.: WO2017/124330
PCT Pub. Date: Jul. 27, 2017

(65) Prior Publication Data
US 2020/0314179 A1    Oct. 1, 2020

(51) Int. Cl.
*H04L 29/08* (2006.01)
*G06F 16/23* (2019.01)

(52) U.S. Cl.
CPC ...... *H04L 67/1097* (2013.01); *G06F 16/2379* (2019.01)

(58) Field of Classification Search
CPC ... H04L 41/0813; H04L 45/021; H04L 45/38; H04L 67/1097; H04L 41/0816; H04L 45/05
See application file for complete search history.

(56) References Cited

U.S. PATENT DOCUMENTS

2014/0146674 A1* 5/2014 Wang ............... H04L 45/38
370/235
2014/0241361 A1   8/2014 Bosshart et al.
(Continued)

FOREIGN PATENT DOCUMENTS

CN    103580909 A   *   2/2014
CN    103580909 A       2/2014
(Continued)

OTHER PUBLICATIONS

Haleplidis, et al., "Software-Defined Networking (SDN): Layers and Architecture Terminology," RFC 7426, Internet Research Task Force (IRTF), IETF Trust, Jan. 2015, 35 pages.
(Continued)

*Primary Examiner* — Shean Tokuta
(74) *Attorney, Agent, or Firm* — Nicholson De Vos Webster & Elliott LLP

(57) ABSTRACT

A method is implemented by a network device acting as a switch in a data plane of a software defined networking (SDN) network. The switch is communicatively coupled to a controller in a control plane of the SDN network, where the controller manages packet processing functionality of the switch. The method to provide data storage resource sharing information to the controller so that the controller can manage data storage resource utilization of the switch. The method includes determining which tables stored in the switch share a data storage resource of the switch and transmitting data storage resource sharing information to the controller, where the data storage resource sharing information includes an indication of the tables that share the data storage resource.

20 Claims, 7 Drawing Sheets

(56) References Cited

U.S. PATENT DOCUMENTS

| | | | |
|---|---|---|---|
| 2016/0072696 A1* | 3/2016 | He | H04L 45/021 |
| | | | 370/254 |
| 2016/0234067 A1* | 8/2016 | Dolganow | H04L 47/2483 |
| 2016/0359734 A1* | 12/2016 | Liu | H04L 41/0686 |
| 2017/0099182 A1* | 4/2017 | DeBolle | H04L 41/12 |
| 2017/0099187 A1* | 4/2017 | Dale | H04L 41/0816 |
| 2017/0142026 A1* | 5/2017 | Klaedtke | H04L 41/0866 |
| 2017/0222909 A1* | 8/2017 | Sadana | H04L 43/0858 |
| 2017/0257309 A1* | 9/2017 | Appanna | H04L 12/4633 |
| 2018/0337827 A1* | 11/2018 | Xiao | H04L 12/4641 |
| 2020/0314179 A1* | 10/2020 | He | H04L 67/1097 |

FOREIGN PATENT DOCUMENTS

| | | | |
|---|---|---|---|
| CN | 103905310 A | | 7/2014 |
| CN | 104052685 A | | 9/2014 |
| CN | 103580909 B | * | 6/2018 |
| KR | 20150051185 A | | 5/2015 |
| WO | WO-2017124330 A1 | * | 7/2017 ......... H04L 41/0813 |

OTHER PUBLICATIONS

Open Networking Foundation, "SDN Architecture Overview," version 1.1, ONF TR-504, Nov. 2014, 8 pages.

Open Networking Foundation, "OpenFlow Switch Specification," version 1.5.1 (Protocol version 0x06), ONF TS-025, Mar. 26, 2015, 283 pages.

* cited by examiner

ADVERTISING NETWORK RESOURCE SHARING STATUS IN SDN

CROSS-REFERENCE TO RELATED APPLICATIONS

This application is a national stage of International Application No. PCT/CN2016/071466, filed Jan. 20, 2016, which is hereby incorporated by reference.

FIELD

Embodiments of the invention relate to the field of Software Defined Networking (SDN), and more specifically, to resource utilization in an SDN network.

BACKGROUND

Software Defined Networking (SDN) is an approach to computer networking that employs a split architecture network in which the forwarding (data) plane is decoupled from the control plane. The use of a split architecture network simplifies the network devices (e.g., switches) implementing the forwarding plane by shifting the intelligence of the network into one or more controllers that oversee the switches. SDN facilitates rapid and open innovation at the network layer by providing a programmable network infrastructure.

The data plane of an SDN network is responsible for performing various packet processing functionalities such as routing, filtering, and metering. The data plane of the SDN network utilizes various tables (e.g., Access Control List (ACL), Forwarding Database (FDB), Label Forwarding Information Base (LFIB), counters) to determine how packets should be processed. These tables are typically stored in one or more data storage resources (Ternary Content Addressable memory (TCAM), counter memory, etc.) of a switch in the data plane. An SDN controller can program/configure the tables to achieve desired packet processing functionality.

In traditional non-SDN networks, each table is typically allocated a dedicated data storage resource. However, in SDN networks, where switches are programmable, multiple tables implemented on a given hardware platform may share the same data storage resource. For example, a commercial switching chipset may include data storage resources such as a hash memory, a TCAM, and counter memory that each store multiple tables. For example, the hash memory may store FDB, LFIB, and Virtual Local Area Network (VLAN) translation tables. The TCAM may store an ACL and routing tables (e.g., Forwarding Information Base (FIB)). The counter memory may store various counter and statistic tables such as tunnel counters, Pseudo Wire (PW) counters, and Quality of Service (QoS) counters. Allowing tables to share a data storage resource frees the network device from having to perform dedicated resource planning for specific tables and provides more flexibility in terms of programming, scalability, and performance.

Due to the decoupling of the data plane from the control plane in SDN networks, the SDN controller is not aware of which tables share the same data storage resource on a given hardware platform. As such, the SDN controller is not able to plan and adjust data storage resource utilization among the tables in an efficient and deterministic manner.

SUMMARY

A method is implemented by a network device acting as a switch in a data plane of a software defined networking (SDN) network. The switch is communicatively coupled to a controller in a control plane of the SDN network, where the controller manages packet processing functionality of the switch. The method to provide data storage resource sharing information to the controller so that the controller can manage data storage resource utilization of the switch. The method includes determining which tables stored in the switch share a data storage resource of the switch and transmitting data storage resource sharing information to the controller, where the data storage resource sharing information includes an indication of the tables that share the data storage resource.

A method is implemented by a network device acting as a controller in a control plane of a software defined networking (SDN) network. The controller is communicatively coupled to a switch in a data plane of the SDN network, where the controller manages packet processing functionality of the switch. The method to manage data storage resource utilization of the switch. The method includes receiving data storage resource sharing information from the switch, where the data storage resource sharing information includes an indication of tables stored in the switch that share a data storage resource of the switch. The method further includes transmitting instructions to the switch to insert one or more entries in a first table from the tables that share the data storage resource, together with instructions to delete one or more entries from one or more other tables that share the data storage resource with the first table in an event that sufficient storage space is not available in the data storage resource for insertion of the one or more entries in the first table.

A network device is configured to act as a switch in a data plane of a software defined networking (SDN) network. The switch is to be communicatively coupled to a controller in a control plane of the SDN network, where the controller is to manage packet processing functionality of the switch. The network device is configured to provide data storage resource sharing information to the controller so that the controller can manage data storage resource utilization of the switch. The network device includes a non-transitory machine-readable storage medium having stored therein a data storage resource sharing component and a processor communicatively coupled to the non-transitory machine-readable storage medium. The processor is configured to execute the data storage resource sharing component. The data storage resource sharing component is configured to determine which tables stored in the switch share a data storage resource of the switch and transmit data storage resource sharing information to the controller, where the data storage resource sharing information includes an indication of the tables that share the data storage resource.

A network device is configured to act as a controller in a control plane of a software defined networking (SDN) network. The controller is to be communicatively coupled to a switch in a data plane of the SDN network, where the controller is to manage packet processing functionality of the switch. The network device is configured to manage data storage resource utilization of the switch. The network device includes a non-transitory machine-readable storage medium having stored therein a data storage resource sharing component and a processor communicatively coupled to the non-transitory machine-readable storage medium. The processor is configured to execute the data storage resource sharing component. The data storage resource sharing component is configured to receive data storage resource sharing information from the switch, where the data storage resource sharing information includes an indication of tables stored in the switch that share a data storage resource of the switch. The data storage resource sharing component is further configured to transmit instructions to the switch to insert one or more entries in a first table from the tables that share the data storage resource, together with instructions to delete one or more entries from one or more other tables that share the data storage resource with the first table in an event that sufficient storage space is not available in the data storage resource for insertion of the one or more entries in the first table.

A non-transitory machine-readable medium has computer code stored therein that is to be executed by a set of one or more processors of a network device acting as a switch in a data plane of a software defined networking (SDN) network. The computer code, when executed by the network device, causes the network device to perform operations for providing data storage resource sharing information to a controller in a control plane of the SDN network so that the controller can manage data storage resource utilization of the switch. The operations include determining which tables stored in the switch share a data storage resource of the switch and transmitting data storage resource sharing information to the controller, where the data storage resource sharing information includes an indication of the tables that share the data storage resource.

A non-transitory machine-readable medium has computer code stored therein that is to be executed by a set of one or more processors of a network device acting as a controller in a control plane of a software defined networking (SDN) network. The computer code, when executed by the network device, causes the network device to perform operations for managing data storage resource utilization of a switch in a data plane of the SDN network. The operations include receiving data storage resource sharing information from the switch, where the data storage resource sharing information includes an indication of tables stored in the switch that share a data storage resource of the switch. The operations further include transmitting instructions to the switch to insert one or more entries in a first table from the tables that share the data storage resource, together with instructions to delete one or more entries from one or more other tables that share the data storage resource with the first table in an event that sufficient storage space is not available in the data storage resource for insertion of the one or more entries in the first table.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
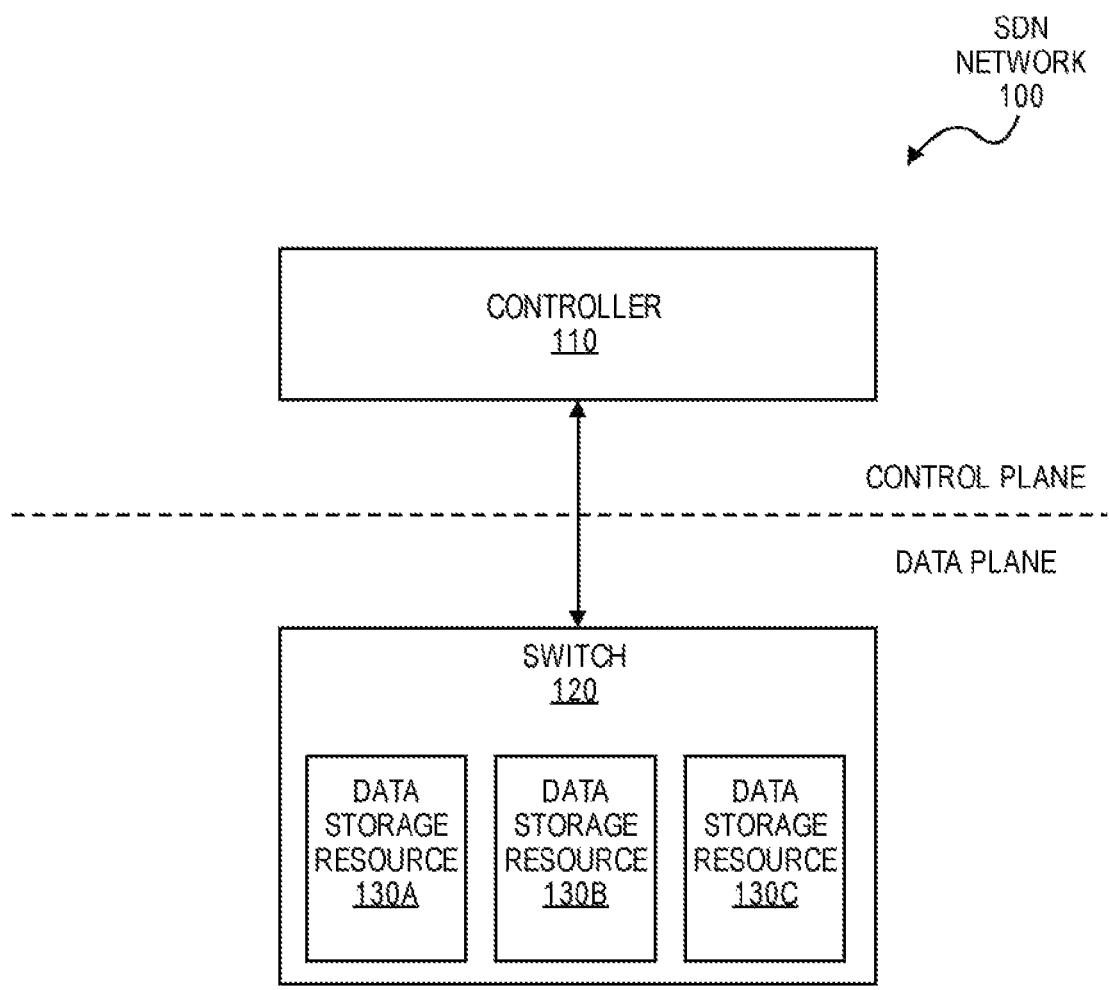
FIG. 1 is a block diagram of a Software Defined Networking (SDN) network in which embodiments of the present disclosure can be implemented.

The following description describes methods and apparatus for providing data storage resource sharing information of a switch to a controller in a Software Defined Networking (SDN) network. The controller may use this information to manage data storage resource utilization of the switch. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Software Defined Networking (SDN) is an approach to computer networking that employs a split architecture network in which the forwarding (data) plane is decoupled from the control plane. SDN networks shift the intelligence of the network into one or more controllers in the control plane that oversee the switches in the data plane. Due to the decoupling of the data plane from the control plane in SDN networks, the controller is not aware of which tables stored in a switch share the same data storage resource. As such, the controller is not able to plan and adjust data storage resource utilization among the tables in an intelligent manner. For example, consider a switch with a data storage resource that stores a Forwarding Database (FDB), a Label Forwarding Information Base (LFIB), and a Virtual Local Area Network (VLAN) translation table (VT). If the controller queries for the maximum capacity of the data storage resource for FDB, the whole capacity of the data storage resource is returned. The same value is returned for LFIB and VT capacity queries. Thus, the controller may attempt to allocate the maximum capacity of the data storage resource to FDB, LFIB, and VT at the same time, which will result in a failure due to insufficient amount of storage space being available in the data storage resource for this allocation request. If only a part of the whole capacity of the data storage resource is returned for each table to avoid the problem of having insufficient data storage resource, then the allocation may underutilize the data storage resource.

Since the SDN controller does not know which tables share the same data storage resource, the SDN controller cannot properly adjust the data storage resource utilization among tables in the event of resource insufficiency (e.g., due to oversubscription). That is, the SDN controller does not know which tables to delete entries from in order to create space for the tables facing resource insufficiency. Deleting an entry in a table only helps address the resource insufficiency problem if the table from which the entry is being deleted shares the same data storage resource as the table facing the resource insufficiency. However, the SDN controller in existing SDN solutions is not able determine which tables to delete entries from due to lack of data storage resource sharing information.

Embodiments overcome the disadvantages of existing techniques by enabling a switch to provide data storage resource sharing information (e.g., information regarding which tables stored in the switch share the same data storage resource) to the controller. The controller can utilize this information to plan and adjust data storage resource utilization among tables stored in the switch in a manner that is efficient and deterministic. For example, when the controller transmits instructions to the switch to insert one or more entries in a table, the controller may also provide instructions to delete one or more entries from one or more other tables that share the same data storage resource with the first table in the event that sufficient storage space is not available in the data storage resource for insertion of the one or more entries in the first table. In this way, the controller has control over which table the switch should delete entries from to create space in the data storage resource in the event that sufficient storage space is not available in the data storage resource. Various other embodiments are described and claimed herein.

FIG. 1 is a block diagram of a Software Defined Networking (SDN) network in which embodiments of the present disclosure can be implemented. As shown, the SDN network 100 includes a controller 110 in a control plane of the SDN network and a switch 120 in the data plane of the SDN network 100. For simplicity and clarity, the data plane is shown as having a single switch 120. However, the data plane typically includes a plurality of switches and is responsible for performing various packet processing functionalities such as routing, filtering, and metering. The switch 120 is a programmable data plane network element that is capable of processing packets in the data plane of the SDN network 100 (e.g., a network element that provides switching and/or routing functionality). The functionality of the switch 120 may be implemented by a special purpose network device or general purpose network device (e.g., using Network Function Virtualization (NFV)). The control plane typically includes one or more controllers (e.g., controller 110) and is responsible for programming/configuring/controlling switches (e.g., switch 120) in the data plane to achieve desired packet processing functionality. For example, the controller 110 may provide instructions to the switch 120 on how to process and/or forward specific types of packets. The functionality of the controller 110 may be implemented by a special purpose network device or general purpose network device (e.g., using NFV).

In one embodiment, the controller 110 and the switch 120 communicate using a communication protocol such as OpenFlow (e.g., OpenFlow 1.5), Forwarding and Control Element Separation (ForCES), Border Gateway Protocol (BGP), Network Configuration Protocol (NETCONF), and Path Computation Element Communication Protocol (PCEP). These communication protocols are provided by way of example and not limitation. It should be understood that the controller 110 and the switch 120 can communicate using other types of communication protocols without departing from the spirit and scope of the present disclosure. The communication interface between the controller 110 and the switch 120 is commonly referred to as a southbound interface.

As shown, the switch 120 includes data storage resources 130A-C. A data storage resource 130, as used herein, refers to a physical or logical repository that can store data. Examples of data storage resources include, but are not limited to, Ternary Content Addressable Memory (TCAM), hash memory, and counter memory. A data storage resource 130 can store table entries for one or more tables. A table, as used herein, refers to a conceptual database in the data plane that is utilized in making packet processing decisions. Examples of tables include, but are not limited to, routing tables, an Access Control List (ACL), and counter tables. Although the switch 120 is shown as having 3 data storage resources (i.e., data storage resource 130A-C), it should be understood that the switch 120 can have any number of data storage resources 130.

Figure 2:
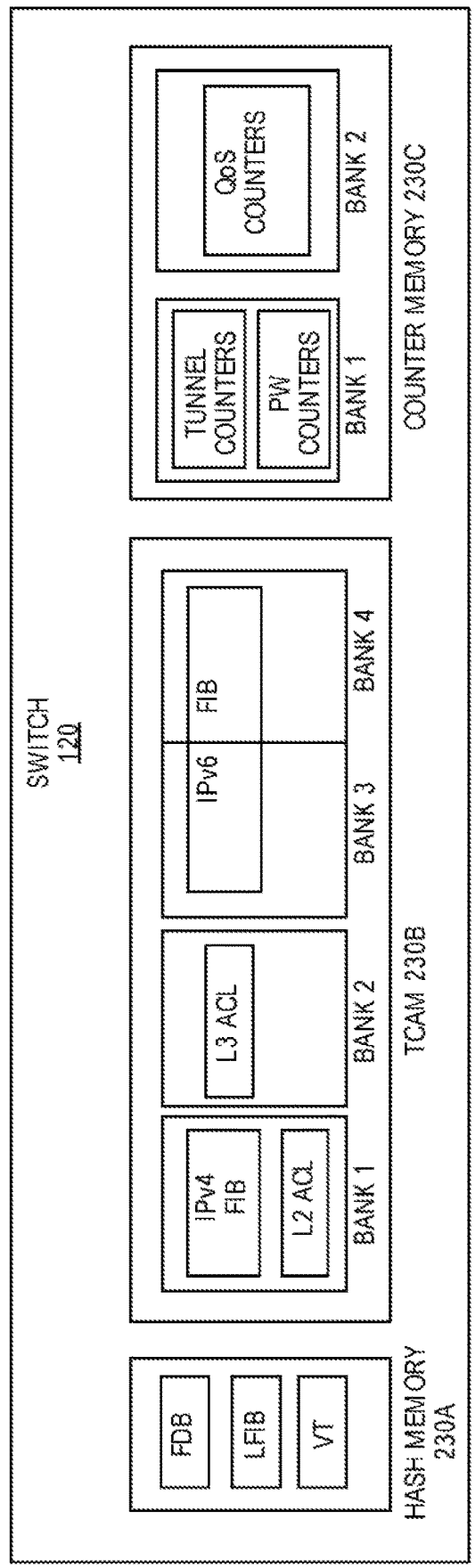
FIG. 2 is a block diagram illustrating tables sharing data storage resources of a switch, according to some embodiments.

FIG. 2 is a block diagram illustrating tables sharing data storage resources of a switch, according to some embodiments. As shown, the switch 120 includes a hash memory data storage resource 230A, a TCAM data storage resource 230B, and a counter memory data storage resource 230C. As shown, FDB, LFIB, and VT share the hash memory 230A.

Internet Protocol version 4 (IPv4) Forwarding Information Base (FIB), Internet Protocol version 6 (IPv6) FIB, Layer 2 (L2) ACL, and Layer 3 (L3) ACL share the TCAM 230B. The TCAM 230B is partitioned into four banks (bank 1, bank 2, bank 3, and bank 4), with IPv4 FIB and L2 ACL occupying bank 1, L3 ACL occupying bank 2, and IPv6 FIB occupying both bank 3 and bank 4. Tunnel counters, Pseudo Wire (PW) counters, and Quality of Service (QoS) counters share the counter memory 230C. The counter memory 230C is partitioned into two banks (bank 1 and bank 2), with the tunnel counters and PW counters occupying bank 1 and the QoS counters occupying bank 2.

In typical SDN networks, the controller 110 is not aware of data storage resource sharing information such as which tables are stored in which data storage resource 130 and which tables share the same data storage resource 130. Embodiments disclosed herein enable a switch 120 to provide data storage resource sharing information to the controller 110 so that the controller 110 can utilize the information to plan and adjust data storage resource utilization among tables stored in the switch 120.

In one embodiment, data storage resource sharing information can be expressed as follows.

Resource Sharing: (table X, table Y, table Z)

This indicates that table X, table Y, and table Z share the same data storage resource 130 (e.g., same hash memory 230A, TCAM 230B, or counter memory 230C). The controller 110 may interpret this as table X, table Y, and table Z share the same data storage resource 130 and deleting one entry from table X can create space to accommodate one additional entry for table Y or table Z.

Some data storage resources 130 are partitioned into multiple banks. For example, the TCAM 230B and the counter memory 230C shown in FIG. 2 are partitioned into 4 banks and 2 banks, respectively. Intra-bank data storage resource sharing may be different from inter-bank data storage resource sharing in terms of the granularity of the amount of storage space that can be interchanged. For example, for intra-bank data storage resource sharing, deleting one entry from a first table stored in a given bank of a data storage resource 130 may create space to accommodate one additional entry for a second table stored in the same bank of the data storage resource 130. However, this may not be the case for inter-bank data storage resource sharing. For inter-bank data storage, it may be the case that a minimum number of entries (e.g., more than one entry) need to be deleted from a first table stored in a first bank of a data storage resource 130 in order to create space to accommodate additional entries in a second table stored in a different bank of the data storage resource 130. As such, information regarding the granularity of the amount of storage space that can be interchanged between tables may be useful for the controller 110. This information may allow the controller 110 to properly adjust data storage resource utilization among the tables. In one embodiment, the data storage resource sharing information can be expressed as follows.

Resource Sharing: (table X, number_XY)<-> (table Y, number_YX)

Resource Sharing: (table X, number_XZ)<-> (table Z, number_ZX)

Resource Sharing: (table Y, number_YZ)<-> (table Z, number_ZY)

Each line above indicates a granularity of storage space amount that can be deleted from one table to create space for another table. For example, the first line indicates that deleting number_YX entries from table Y can create space to accommodate number_XY additional entries in table X, and vice versa. The second line indicates that deleting number_ZX entries from table Z can create space to accommodate number_XZ additional entries in table X, and vice versa. The third line indicates that deleting number_ZY entries from table Z can create space to accommodate number_YZ additional entries in table Y, and vice versa. The data storage resource sharing information not only indicates the tables that share the same data storage resource, but also indicates the granularities of storage space amount that can be interchanged between the tables.

For example, the data storage resource sharing information for the TCAM 230B shown in FIG. 2 with bank size of 1024 entries can be expressed as follows:

(IPv4 FIB, 1)<-> (L2 ACL, 1)
(IPv4 FIB, 1024)<-> (L3 ACL, 1024)
(IPv4 FIB, 2048)<-> (IPv6 FIB, 1024)
(L2 ACL, 1024)>-> (L3 ACL, 1024)
. . .

The above data storage resource sharing information can also be expressed as the following matrix:

TABLE I

|  | IPv4 FIB | L2 ACL | L3 ACL | IPv6 FIB |
|---|---|---|---|---|
| (Row 1) IPv4 FIB | — | (1, 1) | (1024, 1024) | (2048, 1024) |
| (Row 2) L2 ACL | (1, 1) | — | (1024, 1024) | (2048, 1024) |
| (Row 3) L3 ACL | (1024, 1024) | (1024, 1024) | — | (2048, 1024) |
| (Row 4) IPv6 FIB | (1024, 2048) | (1024, 2048) | (1024, 2048) | — |

The matrix can be interpreted as follows: IPv4 FIB, IPv6 FIB, L2 ACL, and L3 ACL share the same data storage resource 130 (e.g., the TCAM 230B). According to row 1 of the matrix, in the event that there is insufficient storage space in the data storage resource 130 for IPv4 FIB, the minimum number of entries that can be deleted from L2 ACL is 1, which creates space to accommodate 1 additional entry for IPv4 FIB. The minimum number of entries that can be deleted from L3 ACL is 1024 entries, which creates space to accommodate 1024 entries for IPv4 FIB. The minimum number of entries that can be deleted from IPv6 FIB is 1024 entries, which creates space to accommodate 2048 entries for IPv4 FIB. The entries in Rows 2, 3, and 4 can be interpreted in a similar manner.

In one embodiment, the switch 120 can dynamically adjust the granularity numbers, depending on the data storage resource fragment status. For example, if the TCAM 230B has unused space scattered therein, then this space can be used to accommodate space for a table, and thus the minimum number of entries to delete from other tables may be reduced.

As a further example, consider the counter memory 230C shown in FIG. 2. The counter memory 230C is similar to the TCAM 230B in that it is also partitioned into banks. Different counter tables with different counter width are stored in different banks. Counter tables having the same counter width may be stored in the same bank. As such, the granularity of the amount of storage space that can be interchanged among tables stored in the counter memory 230C can vary amongst the tables. The data storage resource information can thus be expressed in a similar fashion to that of the TCAM (e.g., with granularity information).

As a further example, consider the hash memory 230A shown in FIG. 2. The data storage resource information of the hash memory 230A can be expressed as follows:

(FDB, 1)<-> (LFIB, 1)<-> (VT, 1)

This indicates that FDB, LFIB, and VT share the same data storage resource 130 (e.g., the hash memory 230A) and that in the event that there is insufficient storage space in the data storage resource 130 for FDB, the minimum number of entries that can be deleted from LFIB or VT is 1, which creates space to accommodate 1 additional entry for FDB. Similarly, in the event that there is insufficient storage space in the data storage resource 130 for LFIB, the minimum number of entries that can be deleted from FDB or VT is 1, which creates space to accommodate 1 additional entry for LFIB. Similarly, in the event that there is insufficient storage space in the data storage resource 130 for VT, the minimum number of entries that can be deleted from FDB or LFB is 1, which creates space to accommodate 1 additional entry for VT.

As will be described in additional detail below, a switch 120 may provide data storage resource sharing information such as those described above (or similar information) to a controller 110 and the controller 110 can use this information to manage data storage resource utilization of the switch 120.

Figure 3:
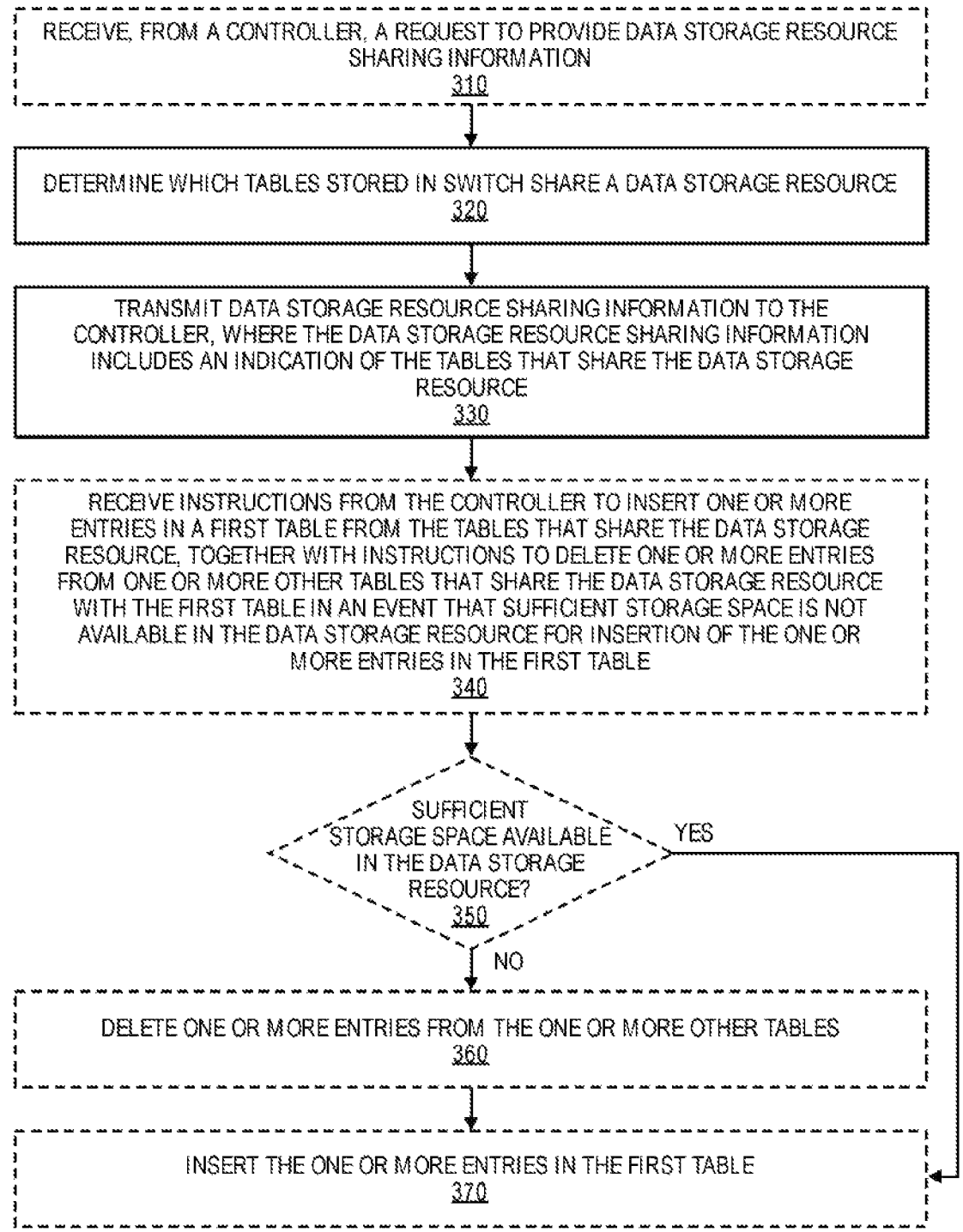
FIG. 3 is a flow diagram of a process performed by a switch for providing data storage resource sharing information to a controller and adjusting data storage resource utilization according to instructions received from the controller, according to some embodiments.

FIG. 3 is a flow diagram of a process performed by a switch for providing data storage resource sharing information to a controller and adjusting data storage resource utilization according to instructions received from the controller, according to some embodiments. In one embodiment, the operations of the flow diagram may be performed by a network device acting as a switch 120 in an SDN network 100. In one embodiment, the switch 120 may communicate with a controller 110 in the SDN network 100 over a southbound interface using a control plane communication protocol (e.g., ForCES or OpenFlow). The operations in this and other flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

In one embodiment, the process is initiated when the switch 120 receives, from a controller 110, a request to provide data storage resource sharing information (block 310). In some embodiments, the process may be initiated without receiving a request from the controller 110. For example, the switch 120 may periodically provide data storage resource sharing information to the controller 110 without receiving a request from the controller 110.

The switch 120 determines which tables stored in the switch 120 share a data storage resource 130 (block 320). In one embodiment, the data storage resource 130 is a hash memory 230A, a TCAM 230B, or a counter memory 230C. The switch 120 then transmits data storage resource sharing information to the controller 110 (block 330). The data storage resource sharing information includes an indication of the tables that share the data storage resource 130. In one embodiment, the data storage resource sharing information also includes an indication of a minimum number of entries that can be deleted from a second table from the tables that share the data storage resource to create storage space in the data storage resource 130 for a first table that shares the data storage resource 130 with the second table in an event that sufficient storage space is not available in the data storage resource 130 for insertion of an entry in the first table. In one embodiment, the data storage resource sharing information further includes an indication of a corresponding number of entries that can be inserted in the first table if the minimum number of entries are deleted from the second table. In one embodiment, the data storage resource sharing information can be expressed as described herein above.

The switch 120 receives instructions from the controller 110 to insert one or more entries in a first table from the tables that share the data storage resource 130, together with instructions to delete one or more entries from one or more other tables that share the data storage resource 130 with the first table in an event that sufficient storage space is not available in the data storage resource 130 for insertion of the one or more entries in the first table (block 340). For example, the instructions to delete one or more entries could be expressed as (table Y, 16) and (table Z, 32). In the event that sufficient storage space is not available in the data storage resource 130 for insertion of the one or more entries in the first table, this instruction indicates that the switch 120 should delete 16 entries from table Y and delete 32 entries from table Z to create space for the insertion of the one or more entries in the first table. In one embodiment, special numbers or designations can be used to instruct the switch 120 to delete an entire table or to delete entries on demand. This allows the controller 110 to offload some of the data storage resource management responsibilities to the switch 120.

The switch 120 determines whether sufficient storage space is available in the data storage resource 130 for insertion of the one or more entries in the first table (decision block 350). If the switch 120 determines that there is sufficient storage space available in the data storage resource 130, the switch 120 inserts the one or more entries in the first table (block 370). On the other hand, if the switch 120 determines that there is insufficient storage space available in the data storage resource 130, the switch 120 deletes one or more entries from the one or more other tables (block 360), as indicated in the instructions received from the controller 110. In this way, when sufficient storage space is not available in a data storage resource for a given table, the switch 120 deletes entries from one or more other tables that share the same data storage resource 130 as the given table, according to the instructions received from the controller 110. Deleting the entries creates space in the data storage resource 130 for the first table. Once the entries are deleted, the switch 120 may then insert the one or more entries in the first table (block 370).

Figure 4:
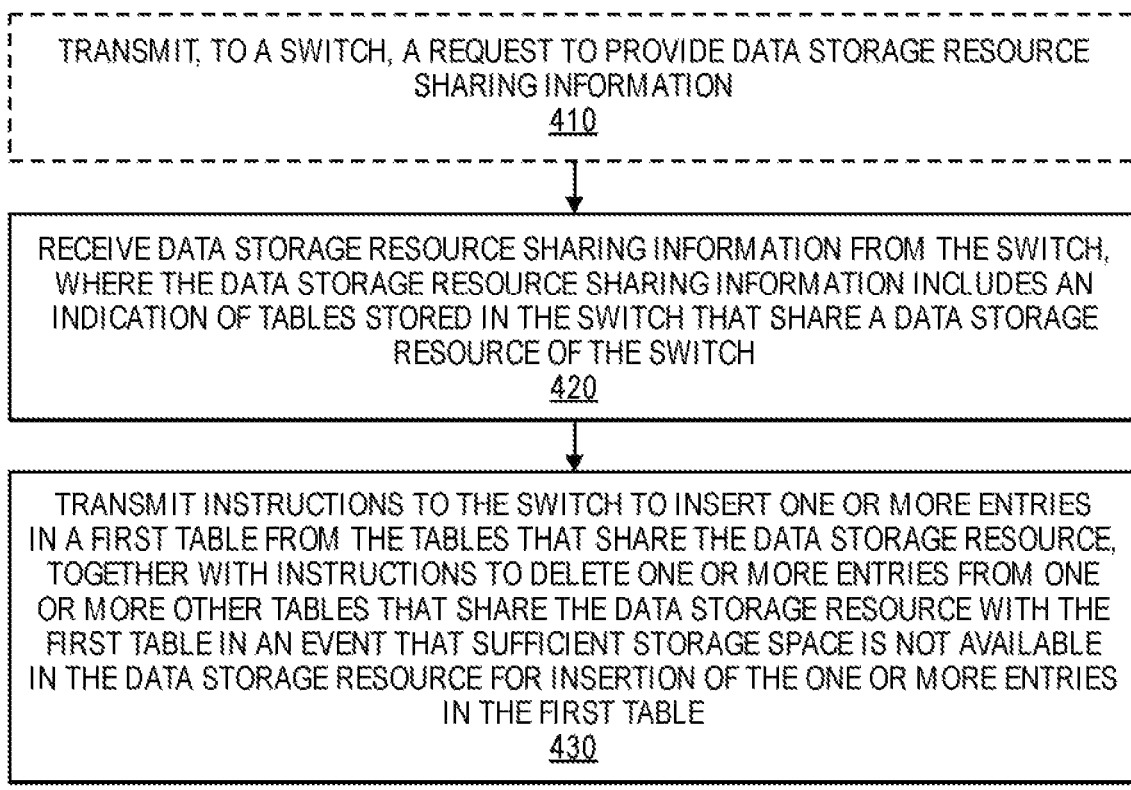
FIG. 4 is a flow diagram of a process performed by a controller for managing data storage resource utilization of a switch, according to some embodiments.

FIG. 4 is a flow diagram of a process performed by a controller for managing data storage resource utilization of a switch, according to some embodiments. In one embodiment, the operations of the flow diagram may be performed by a network device acting as a controller 110 in an SDN network. In one embodiment, the controller 110 may communicate with a switch 120 in the SDN network over a southbound interface using a control plane communication protocol (e.g., ForCES or OpenFlow).

In one embodiment, the process is initiated when the controller 110 transmits, to a switch 120, a request to provide data storage resource sharing information (block 410). In some embodiments, the process may be initiated without the controller 110 transmitting a request to the switch 120. For example, the switch 120 may periodically provide data storage resource sharing information to the controller 110 without receiving a request from the controller 110.

The controller 110 receives data storage resource sharing information from the switch 120 (block 420). The data storage resource sharing information includes an indication of the tables stored in the switch 120 that share a data storage resource 130 of the switch 120. In one embodiment, the data storage resource sharing information includes an indication of a minimum number of entries that can be deleted from a second table that shares the data storage resource 130 with the first table to create storage space in the data storage resource 130 for the first table in the event that sufficient storage space is not available in the data storage resource 130 for insertion of an entry in the first table. In one embodiment, the data storage resource sharing information further includes an indication of a corresponding number of entries that can be inserted in the first table if the minimum number of entries are deleted from the second table. In one embodiment, the data storage resource sharing information can be expressed as described herein above.

The controller 110 transmits instructions to the switch 120 to insert one or more entries in a first table from the tables that share the data storage resource 130, together with instructions to delete one or more entries from one or more other tables that share the data storage resource 130 with the first table in an event that sufficient storage space is not available in the data storage resource 130 for insertion of the one or more entries in the first table (block 430). The controller 110 has knowledge of which tables stored in the switch 120 share the same data storage resource 130 based on the data storage resource sharing information it received from the switch 120 (e.g., in block 420), and can use this information to determine which table to delete entries from in the event that sufficient storage space is not available in the data storage resource 130. In the case that there are multiple tables that share the same data storage resource 130 with the first table, the policy for choosing which table to delete entries from (and how many entries to delete) is managed by the control plane and is configurable by a user (e.g., a network operator or administrator). For example, in one embodiment, the controller 110 may determine which table to delete entries from based on the granularities of storage space amount that can be interchanged between tables. For example, smaller granularities may be preferred. In one embodiment, the controller 110 determines a number of entries to delete from the second table based on the data storage resource sharing information received from the switch. For example, the controller 110 may utilize the data storage resource sharing information received from the switch 120 to determine how many entries should be deleted from the second table in order to accommodate a certain number of additional entries in the first table. In one embodiment, the instructions to delete the one or more entries in the event that sufficient storage space is not available in the data storage resource 130 includes an indication of a number of entries to delete from each of the one or more other tables in the event that sufficient storage space is not available in the data storage resource 130 for insertion of the one or more entries in the first table. In this way, the controller 110 can instruct the switch 120 to delete entries from one or more tables that share the same data storage resource 130 as a given table in the event that sufficient storage space is not available in the data storage resource 130 for the given table. The controller 110 is able to provide such instructions based on its knowledge of the data storage resource sharing information it received from the switch 120.

In one embodiment, the controller 110 may give preference to one table over another table when managing data storage resource utilization of a switch 120. This may help against malicious attacks on the switch 120. For example, consider a switch 120 in which FDB and LFIB share the same data storage resource 130. Malicious attacks can cause FDB table size to become very large. On the other hand, LFIB table size is relatively deterministic. Also, considering that a single FDB table entry represents one host, while a single LFIB table entry generally represents an IP prefix, it is preferable that LFIB is allocated storage space over FDB if sufficient storage space is not available in the data storage resource 130. By deleting partial FDB table entries, LFIB can be allocated additional storage space, and thus its traffic is protected.

Giving preference to one table over another table may also help guarantee important services. Consider a switch 120 that includes a TCAM data storage resource (e.g., 230B). TCAM 230B is typically an expensive and limited data storage resource 130 used by multiple tables (e.g., ACL, QoS, FIB, etc.) for traffic classification and other packet processing functions. In the event that the TCAM 230B does not have sufficient storage space available, QoS related table entries can be deleted to guarantee that FIB table entries can be stored in the TCAM 230B in order to guarantee non-interrupted traffic flow (given that non-interrupted traffic flow has higher priority than other goals). In this way, the corresponding services for FIB such as L3 VPN are guaranteed.

The data storage resource sharing information can also be utilized during a resource planning phase. For example, when increasing or decreasing one table size, the amount of storage space allocated to other tables sharing the same data storage resource 130 can be adjusted accordingly, to reflect the actual amount of storage space available in the data storage resource 130.

Figures 5A, 5B:
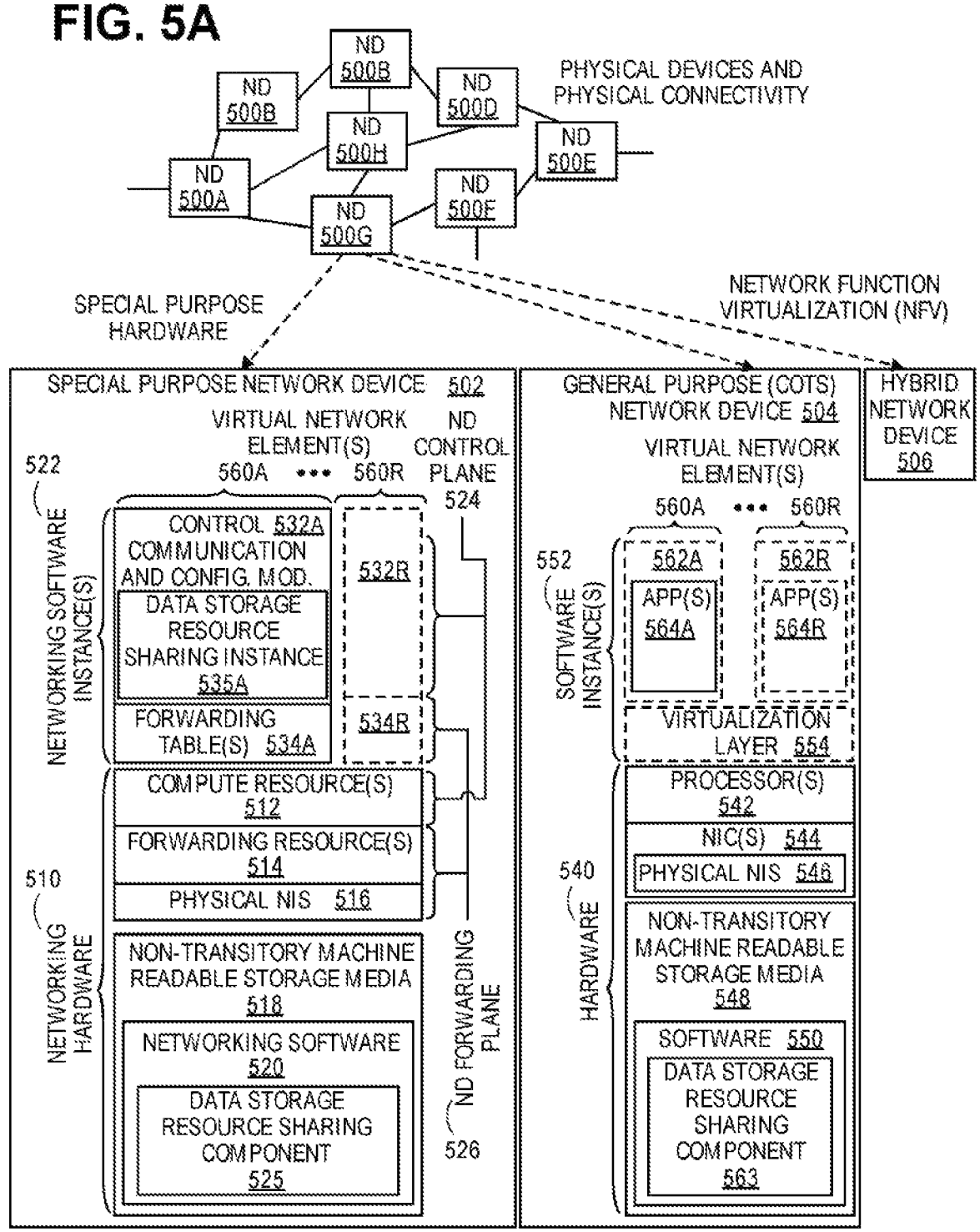
FIG. 5A illustrates connectivity between network devices (NDs) within an exemplary network, as well as three exemplary implementations of the NDs, according to some embodiments.
FIG. 5B illustrates an exemplary way to implement a special-purpose network device according to some embodiments.

FIG. 5A illustrates connectivity between network devices (NDs) within an exemplary network, as well as three exemplary implementations of the NDs, according to some embodiments. FIG. 5A shows NDs 500A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 500A, E, and F illustrates that these NDs act as ingress and egress points for the network (and thus, these NDs are sometimes referred to as edge NDs; while the other NDs may be called core NDs).

Two of the exemplary ND implementations in FIG. 5A are: 1) a special-purpose network device 502 that uses custom application—specific integrated—circuits (ASICs) and a proprietary operating system (OS); and 2) a general purpose network device 504 that uses common off-the-shelf (COTS) processors and a standard OS.

The special-purpose network device 502 includes networking hardware 510 comprising compute resource(s) 512 (which typically include a set of one or more processors), forwarding resource(s) 514 (which typically include one or more ASICs and/or network processors), and physical network interfaces (NIs) 516 (sometimes called physical ports), as well as non-transitory machine readable storage media 518 having stored therein networking software 520. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 500A-H. During operation, the networking software 520 may be executed by the networking hardware 510 to instantiate a set of one or more networking software instance(s) 522. Each of the networking software instance(s) 522, and that part of the networking hardware 510 that executes that network software instance (be it hardware dedicated to that networking software instance and/or time slices of hardware temporally shared by that networking software instance with others of the networking software instance(s) 522), form a separate virtual network element 530A-R. Each of the virtual network element(s) (VNEs) 530A-R includes a control communication and configuration module 532A-R (sometimes referred to as a local control module or control communication module) and forwarding table(s) 534A-R, such that a given virtual network element (e.g., 530A) includes the control communication and configuration module (e.g., 532A), a set of one or more forwarding table(s) (e.g., 534A), and that portion of the networking hardware 510 that executes the virtual network element (e.g., 530A).

Software 520 can include code such as data storage resource sharing component 525, which when executed by networking hardware 510, causes the special-purpose network device 502 to perform operations of one or more embodiments of the present disclosure as part networking software instances 522 (data storage resource sharing instance 535A).

The special-purpose network device 502 is often physically and/or logically considered to include: 1) a ND control plane 524 (sometimes referred to as a control plane) comprising the compute resource(s) 512 that execute the control communication and configuration module(s) 532A-R; and 2) a ND forwarding plane 526 (sometimes referred to as a forwarding plane, a data plane, or a media plane) comprising the forwarding resource(s) 514 that utilize the forwarding table(s) 534A-R and the physical NIs 516. By way of example, where the ND is a router (or is implementing routing functionality), the ND control plane 524 (the compute resource(s) 512 executing the control communication and configuration module(s) 532A-R) is typically responsible for participating in controlling how data (e.g., packets) is to be routed (e.g., the next hop for the data and the outgoing physical NI for that data) and storing that routing information in the forwarding table(s) 534A-R, and the ND forwarding plane 526 is responsible for receiving that data on the physical NIs 516 and forwarding that data out the appropriate ones of the physical NIs 516 based on the forwarding table(s) 534A-R.

FIG. 5B illustrates an exemplary way to implement the special-purpose network device 502 according to some embodiments. FIG. 5B shows a special-purpose network device including cards 538 (typically hot pluggable). While in some embodiments the cards 538 are of two types (one or more that operate as the ND forwarding plane 526 (sometimes called line cards), and one or more that operate to implement the ND control plane 524 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 536 (e.g., a first full mesh coupling the line cards and a second full mesh coupling all of the cards).

Returning to FIG. 5A, the general purpose network device 504 includes hardware 540 comprising a set of one or more processor(s) 542 (which are often COTS processors) and network interface controller(s) 544 (NICs; also known as network interface cards) (which include physical NIs 546), as well as non-transitory machine readable storage media 548 having stored therein software 550. During operation, the processor(s) 542 execute the software 550 to instantiate one or more sets of one or more applications 564A-R. While one embodiment does not implement virtualization, alternative embodiments may use different forms of virtualization—represented by a virtualization layer 554 and software containers 562A-R. For example, one such alternative embodiment implements operating system-level virtualization, in which case the virtualization layer 554 represents the kernel of an operating system (or a shim executing on a base operating system) that allows for the creation of multiple software containers 562A-R that may each be used to execute one of the sets of applications 564A-R. In this embodiment, the multiple software containers 562A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: 1) the virtualization layer 554 represents a hypervisor (sometimes referred to as a virtual machine monitor (VMM)) or a hypervisor executing on top of a host operating system; and 2) the software containers 562A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications 564A-R, as well as the virtualization layer 554 and software containers 562A-R if implemented, are collectively referred to as software instance(s) 552. Each set of applications 564A-R, corresponding software container 562A-R if implemented, and that part of the hardware 540 that executes them (be it hardware dedicated to that execution and/or time slices of hardware temporally shared by software containers 562A-R), forms a separate virtual network element(s) 560A-R.

The virtual network element(s) 560A-R perform similar functionality to the virtual network element(s) 530A-R—e.g., similar to the control communication and configuration module(s) 532A and forwarding table(s) 534A (this virtualization of the hardware 540 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the software container(s) 562A-R differently. For example, while embodiments of the invention are illustrated with each software container 562A-R corresponding to one VNE 560A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 562A-R to VNEs also apply to embodiments where such a finer level of granularity is used.

In certain embodiments, the virtualization layer 554 includes a virtual switch that provides similar forwarding services as a physical Ethernet switch. Specifically, this virtual switch forwards traffic between software containers 562A-R and the NIC(s) 544, as well as optionally between the software containers 562A-R; in addition, this virtual switch may enforce network isolation between the VNEs 560A-R that by policy are not permitted to communicate with each other (e.g., by honoring virtual local area networks (VLANs)).

Software 550 can include code such as data storage resource sharing component 563, which when executed by processor(s) 542, cause the general purpose network device 504 to perform operations of one or more embodiments of the present disclosure as part software containers 562A-R.

The third exemplary ND implementation in FIG. 5A is a hybrid network device 506, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 502) could provide for para-virtualization to the networking hardware present in the hybrid network device 506.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 530A-R, VNEs 560A-R, and those in the hybrid network device 506) receives data on the physical NIs (e.g., 516, 546) and forwards that data out the appropriate ones of the physical NIs (e.g., 516, 546). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services (DSCP) values.

Figure 5C:
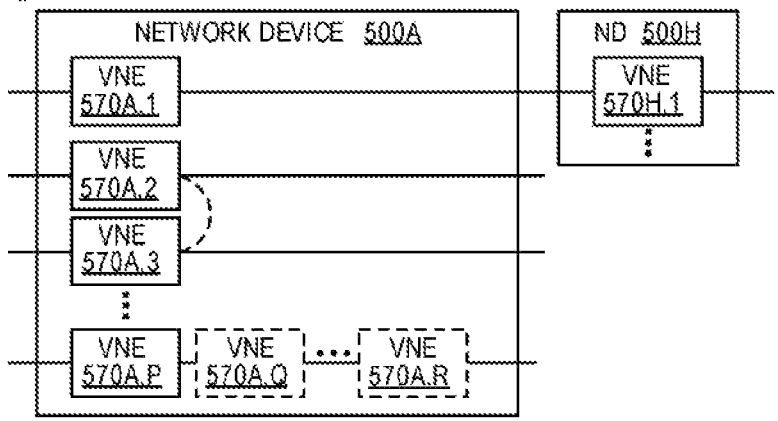
FIG. 5C illustrates various exemplary ways in which virtual network elements (VNEs) may be coupled according to some embodiments.

FIG. 5C illustrates various exemplary ways in which VNEs may be coupled according to some embodiments. FIG. 5C shows VNEs 570A. 1-570A.P (and optionally VNEs 570A.Q-570A.R) implemented in ND 500A and VNE 570H.1 in ND 500H. In FIG. 5C, VNEs 570A. 1-P are separate from each other in the sense that they can receive packets from outside ND 500A and forward packets outside of ND 500A; VNE 570A.1 is coupled with VNE 570H.1, and thus they communicate packets between their respective NDs; VNE 570A.2-570A.3 may optionally forward packets between themselves without forwarding them outside of the ND 500A; and VNE 570A.P may optionally be the first in a chain of VNEs that includes VNE 570A.Q followed by VNE 570A.R (this is sometimes referred to as dynamic service chaining, where each of the VNEs in the series of VNEs provides a different service—e.g., one or more layer 4-7 network services). While FIG. 5C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 5A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 5A may also host one or more such servers (e.g., in the case of the general purpose network device 504, one or more of the software containers 562A-R may operate as servers; the same would be true for the hybrid network device 506; in the case of the special-purpose network device 502, one or more such servers could also be run on a virtualization layer executed by the compute resource(s) 512); in which case the servers are said to be co-located with the VNEs of that ND.

A virtual network is a logical abstraction of a physical network (such as that in FIG. 5A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 5D:
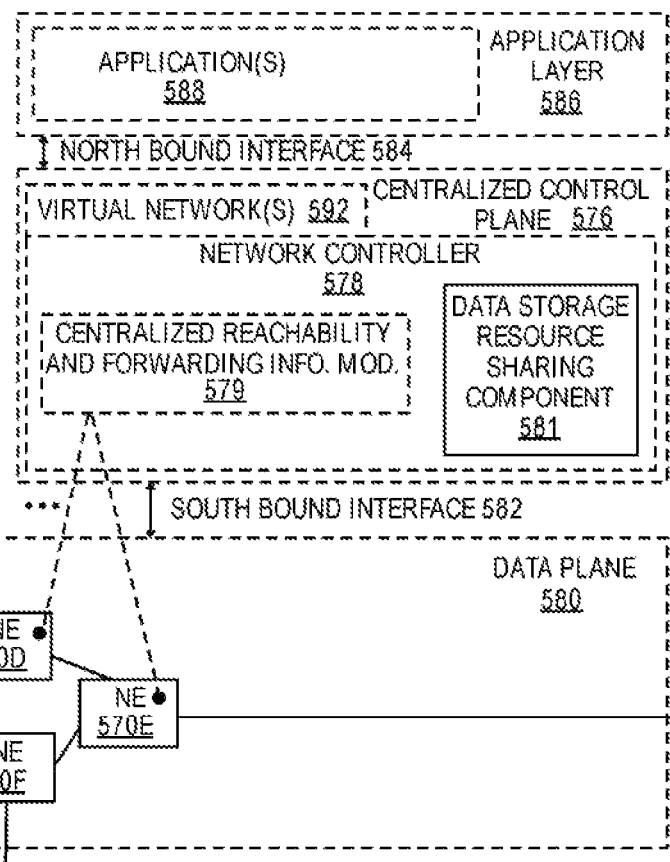
FIG. 5D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments.

FIG. 5D illustrates a network with a single network element on each of the NDs of FIG. 5A, and within this straight forward approach contrasts a traditional distributed approach (commonly used by traditional routers) with a centralized approach for maintaining reachability and forwarding information (also called network control), according to some embodiments. Specifically, FIG. 5D illustrates network elements (NEs) 570A-H with the same connectivity as the NDs 500A-H of FIG. 5A.

FIG. 5D illustrates that the distributed approach 572 distributes responsibility for generating the reachability and forwarding information across the NEs 570A-H; in other words, the process of neighbor discovery and topology discovery is distributed.

For example, where the special-purpose network device 502 is used, the control communication and configuration module(s) 532A-R of the ND control plane 524 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP)), Label Distribution Protocol (LDP), Resource Reservation Protocol (RSVP), as well as RSVP-Traffic Engineering (TE): Extensions to RSVP for LSP Tunnels, Generalized Multi-Protocol Label Switching (GMPLS) Signaling RSVP-TE that communicate with other NEs to exchange routes, and then selects those routes based on one or more routing metrics. Thus, the NEs 570A-H (e.g., the compute resource(s) 512 executing the control communication and configuration module(s) 532A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 524. The ND control plane 524 programs the ND forwarding plane 526 with information (e.g., adjacency and route information) based on the routing structure(s). For example, the ND control plane 524 programs the adjacency and route information into one or more forwarding table(s) 534A-R (e.g., Forwarding Information Base (FIB), Label Forwarding Information Base (LFIB), and one or more adjacency structures) on the ND forwarding plane 526. For layer 2 forwarding, the ND can store one or more bridging tables that are used to forward data based on the layer 2 information in that data. While the above example uses the special-purpose network device 502, the same distributed approach 572 can be implemented on the general purpose network device 504 and the hybrid network device 506.

FIG. 5D illustrates that a centralized approach 574 (also known as Software Defined Networking (SDN)) that decouples the system that makes decisions about where traffic is sent from the underlying systems that forwards traffic to the selected destination. The illustrated centralized approach 574 has the responsibility for the generation of reachability and forwarding information in a centralized control plane 576 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 576 has a south bound interface 582 with a data plane 580 (sometime referred to the infrastructure layer, network forwarding plane, or forwarding plane (which should not be confused with a ND forwarding plane)) that includes the NEs 570A-H (sometimes referred to as switches, forwarding elements, data plane elements, or nodes). The centralized control plane 576 includes a network controller 578, which includes a centralized reachability and forwarding information module 579 that determines the reachability within the network and distributes the forwarding information to the NEs 570A-H of the data plane 580 over the south bound interface 582 (which may use the OpenFlow protocol). Thus, the network intelligence is centralized in the centralized control plane 576 executing on electronic devices that are typically separate from the NDs. In one embodiment, the network controller 578 may include a data storage resource sharing component 581 that when executed by the network controller 578, causes the network controller 578 to perform operations of one or more embodiments described herein above.

For example, where the special-purpose network device 502 is used in the data plane 580, each of the control communication and configuration module(s) 532A-R of the ND control plane 524 typically include a control agent that provides the VNE side of the south bound interface 582. In this case, the ND control plane 524 (the compute resource(s) 512 executing the control communication and configuration module(s) 532A-R) performs its responsibility for participating in controlling how data (e.g., packets) is to be routed (e.g., the next hop for the data and the outgoing physical NI for that data) through the control agent communicating with the centralized control plane 576 to receive the forwarding information (and in some cases, the reachability information) from the centralized reachability and forwarding information module 579 (it should be understood that in some embodiments, the control communication and configuration module(s) 532A-R, in addition to communicating with the centralized control plane 576, may also play some role in determining reachability and/or calculating forwarding information—albeit less so than in the case of a distributed approach; such embodiments are generally considered to fall under the centralized approach 574, but may also be considered a hybrid approach).

While the above example uses the special-purpose network device 502, the same centralized approach 574 can be implemented with the general purpose network device 504 (e.g., each of the VNE 560A-R performs its responsibility for controlling how data (e.g., packets) is to be routed (e.g., the next hop for the data and the outgoing physical NI for that data) by communicating with the centralized control plane 576 to receive the forwarding information (and in some cases, the reachability information) from the centralized reachability and forwarding information module 579; it should be understood that in some embodiments, the VNEs 560A-R, in addition to communicating with the centralized control plane 576, may also play some role in determining reachability and/or calculating forwarding information—albeit less so than in the case of a distributed approach) and the hybrid network device 506. In fact, the use of SDN techniques can enhance the NFV techniques typically used in the general purpose network device 504 or hybrid network device 506 implementations as NFV is able to support SDN by providing an infrastructure upon which the SDN software can be run, and NFV and SDN both aim to make use of commodity server hardware and physical switches.

FIG. 5D also shows that the centralized control plane 576 has a north bound interface 584 to an application layer 586, in which resides application(s) 588. The centralized control plane 576 has the ability to form virtual networks 592 (sometimes referred to as a logical forwarding plane, network services, or overlay networks (with the NEs 570A-H of the data plane 580 being the underlay network)) for the application(s) 588. Thus, the centralized control plane 576 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 5D shows the distributed approach 572 separate from the centralized approach 574, the effort of network control may be distributed differently or the two combined in certain embodiments of the invention. For example: 1) embodiments may generally use the centralized approach (SDN) 574, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 574, but may also be considered a hybrid approach.

While FIG. 5D illustrates the simple case where each of the NDs 500A-H implements a single NE 570A-H, it should be understood that the network control approaches described with reference to FIG. 5D also work for networks where one or more of the NDs 500A-H implement multiple VNEs (e.g., VNEs 530A-R, VNEs 560A-R, those in the hybrid network device 506). Alternatively or in addition, the network controller 578 may also emulate the implementation of multiple VNEs in a single ND. Specifically, instead of (or in addition to) implementing multiple VNEs in a single ND, the network controller 578 may present the implementation of a VNE/NE in a single ND as multiple VNEs in the virtual networks 592 (all in the same one of the virtual network(s) 592, each in different ones of the virtual network(s) 592, or some combination). For example, the network controller 578 may cause an ND to implement a single VNE (a NE) in the underlay network, and then logically divide up the resources of that NE within the centralized control plane 576 to present different VNEs in the virtual network(s) 592 (where these different VNEs in the overlay networks are sharing the resources of the single VNE/NE implementation on the ND in the underlay network).

Figure 5E:
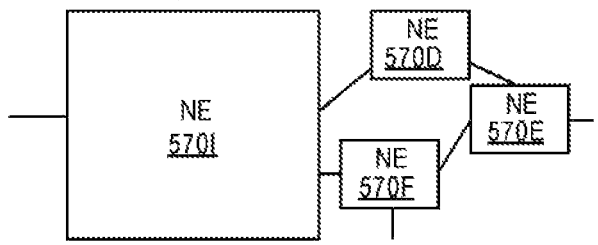
FIG. 5E illustrates the simple case of where each of the NDs implements a single NE, but a centralized control plane has abstracted multiple of the NEs in different NDs into (to represent) a single NE in one of the virtual network(s), according to some embodiments.
Figure 5F:
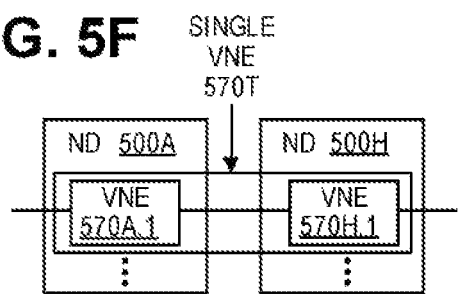
FIG. 5F illustrates a case where multiple VNEs are implemented on different NDs and are coupled to each other, and where a centralized control plane has abstracted these multiple VNEs such that they appear as a single VNE within one of the virtual networks, according to some embodiments.

On the other hand, FIGS. 5E and 5F respectively illustrate exemplary abstractions of NEs and VNEs that the network controller 578 may present as part of different ones of the virtual networks 592. FIG. 5E illustrates the simple case of where each of the NDs 500A-H implements a single NE 570A-H (see FIG. 5D), but the centralized control plane 576 has abstracted multiple of the NEs in different NDs (the NEs 570A-C and G-H) into (to represent) a single NE 5701 in one of the virtual network(s) 592 of FIG. 5D, according to some embodiments. FIG. 5E shows that in this virtual network, the NE 5701 is coupled to NE 570D and 570F, which are both still coupled to NE 570E.

FIG. 5F illustrates a case where multiple VNEs (VNE 570A.1 and VNE 570H.1) are implemented on different NDs (ND 500A and ND 500H) and are coupled to each other, and where the centralized control plane 576 has abstracted these multiple VNEs such that they appear as a single VNE 570T within one of the virtual networks 592 of FIG. 5D, according to some embodiments. Thus, the abstraction of a NE or VNE can span multiple NDs.

While some embodiments implement the centralized control plane 576 as a single entity (e.g., a single instance of software running on a single electronic device), alternative embodiments may spread the functionality across multiple entities for redundancy and/or scalability purposes (e.g., multiple instances of software running on different electronic devices).

Figure 6:
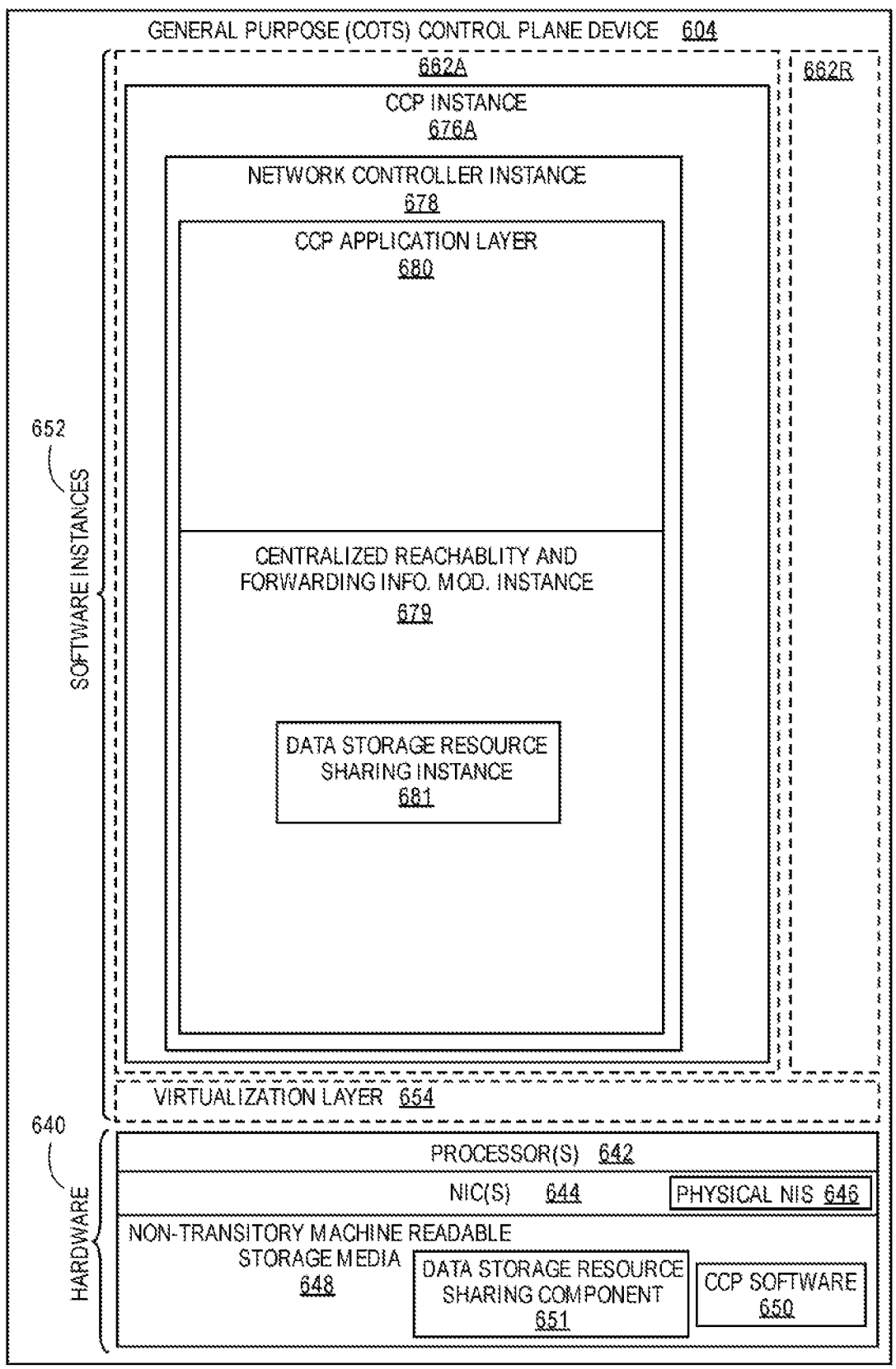
FIG. 6 illustrates a general purpose control plane device with centralized control plane (CCP) software, according to some embodiments.

Similar to the network device implementations, the electronic device(s) running the centralized control plane 576, and thus the network controller 578 including the centralized reachability and forwarding information module 579, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 6 illustrates, a general purpose control plane device 604 including hardware 640 comprising a set of one or more processor(s) 642 (which are often COTS processors) and network interface controller(s) 644 (NICs; also known as network interface cards) (which include physical NIs 646), as well as non-transitory machine readable storage media 648 having stored therein centralized control plane (CCP) software 650 and a data storage resource sharing component 651.

In embodiments that use compute virtualization, the processor(s) 642 typically execute software to instantiate a virtualization layer 654 and software container(s) 662A-R (e.g., with operating system-level virtualization, the virtualization layer 654 represents the kernel of an operating system (or a shim executing on a base operating system) that allows for the creation of multiple software containers 662A-R (representing separate user space instances and also called virtualization engines, virtual private servers, or jails) that may each be used to execute a set of one or more applications; with full virtualization, the virtualization layer 654 represents a hypervisor (sometimes referred to as a virtual machine monitor (VMM)) or a hypervisor executing on top of a host operating system, and the software containers 662A-R each represent a tightly isolated form of software container called a virtual machine that is run by the hypervisor and may include a guest operating system; with para-virtualization, an operating system or application running with a virtual machine may be aware of the presence of virtualization for optimization purposes). Again, in embodiments where compute virtualization is used, during operation an instance of the CCP software 650 (illustrated as CCP instance 676A) is executed within the software container 662A on the virtualization layer 654. In embodiments where compute virtualization is not used, the CCP instance 676A on top of a host operating system is executed on the "bare metal" general purpose control plane device 604. The instantiation of the CCP instance 676A, as well as the virtualization layer 654 and software containers 662A-R if implemented, are collectively referred to as software instance(s) 652.

In some embodiments, the CCP instance 676A includes a network controller instance 678. The network controller instance 678 includes a centralized reachability and forwarding information module instance 679 (which is a middleware layer providing the context of the network controller 578 to the operating system and communicating with the various NEs), and an CCP application layer 680 (sometimes referred to as an application layer) over the middleware layer (providing the intelligence required for various network operations such as protocols, network situational awareness, and user—interfaces). At a more abstract level, this CCP application layer 680 within the centralized control plane 576 works with virtual network view(s) (logical view(s) of the network) and the middleware layer provides the conversion from the virtual networks to the physical view.

The data storage resource sharing component 651 can be executed by hardware 640 to perform operations of one or more embodiments of the present disclosure as part of software instances 652 (e.g., data storage resource sharing instance 681).

The centralized control plane 576 transmits relevant messages to the data plane 580 based on CCP application layer 680 calculations and middleware layer mapping for each flow. A flow may be defined as a set of packets whose headers match a given pattern of bits; in this sense, traditional IP forwarding is also flow—based forwarding where the flows are defined by the destination IP address for example; however, in other implementations, the given pattern of bits used for a flow definition may include more fields (e.g., 10 or more) in the packet headers. Different NDs/NEs/VNEs of the data plane 580 may receive different messages, and thus different forwarding information. The data plane 580 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 580, the packet (or a subset of the packet header and content) is typically forwarded to the centralized control plane 576. The centralized control plane 576 will then program forwarding table entries into the data plane 580 to accommodate packets belonging to the flow of the unknown packet. Once a specific forwarding table entry has been programmed into the data plane 580 by the centralized control plane 576, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

An embodiment of the invention may be an article of manufacture in which a non-transitory machine-readable medium (such as microelectronic memory) has stored thereon instructions (e.g., computer code) which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

The invention claimed is:

1. A method implemented by a network device acting as a switch in a data plane of a software defined networking (SDN) network, the switch communicatively coupled to a controller in a control plane of the SDN network, where the controller manages packet processing functionality of the switch, the method to provide data storage resource sharing information to the controller so that the controller can manage data storage resource utilization of the switch, the method comprising:
  determining which tables stored in the switch share a data storage resource of the switch;
  transmitting data storage resource sharing information to the controller, wherein the data storage resource sharing information includes an indication of the tables that share the data storage resource;

receiving an instruction from the controller to insert one or more entries in a first table from the tables that share the data storage resource, wherein the instruction indicates one or more other tables that share the data storage resource with the first table; and deleting one or more entries from the one or more other tables that share the data storage resource with the first table indicated in the instruction in response to a determination that sufficient storage space is not available in the data storage resource for insertion of the one or more entries in the first table.

2. The method of claim 1, further comprising:
inserting the one or more entries in the first table after deleting the one or more entries from the one or more other tables.

3. The method of claim 1, wherein the data storage resource sharing information further includes an indication of a minimum number of entries that can be deleted from a second table from the tables that share the data storage resource to create storage space in the data storage resource for the first table in an event that sufficient storage space is not available in the data storage resource for insertion of an entry in the first table.

4. The method of claim 3, wherein the data storage resource sharing information further includes an indication of a corresponding number of entries that can be inserted in the first table if the minimum number of entries are deleted from the second table.

5. The method of claim 1, further comprising:
receiving, from the controller, a request to provide the data storage resource sharing information, wherein transmitting the data storage resource sharing information to the controller is in response to receiving the request from the controller.

6. The method of claim 1, wherein the data storage resource is any one of a hash memory, a Ternary Content Addressable Memory (TCAM), and a counter memory.

7. A method implemented by a network device acting as a controller in a control plane of a software defined networking (SDN) network, the controller communicatively coupled to a switch in a data plane of the SDN network, where the controller manages packet processing functionality of the switch, the method to manage data storage resource utilization of the switch, the method comprising:
receiving data storage resource sharing information from the switch, wherein the data storage resource sharing information includes an indication of tables stored in the switch that share a data storage resource of the switch; and
transmitting instructions to the switch to insert one or more entries in a first table from the tables that share the data storage resource, together with instructions to delete one or more entries from one or more other tables that share the data storage resource with the first table in an event that sufficient storage space is not available in the data storage resource for insertion of the one or more entries in the first table.

8. The method of claim 7, wherein the data storage resource sharing information further includes an indication of a minimum number of entries that can be deleted from a second table that shares the data storage resource with the first table to create storage space in the data storage resource for the first table in the event that sufficient storage space is not available in the data storage resource for insertion of an entry in the first table.

9. The method of claim 8, wherein the data storage resource sharing information further includes an indication of a corresponding number of entries that can be inserted in the first table if the minimum number of entries are deleted from the second table.

10. The method of claim 9, further comprising:
determining a number of entries to delete from the second table in the event that sufficient storage space is not available in the data storage resource based on the data storage resource sharing information.

11. The method of claim 7, wherein the instructions to delete the one or more entries in the event that sufficient storage space is not available in the data storage resource includes an indication of a number of entries to delete from each of the one or more other tables in the event that sufficient storage space is not available in the data storage resource for insertion of the one or more entries in the first table.

12. The method of claim 7, further comprising:
transmitting, to the switch, a request to provide the data storage resource sharing information.

13. A network device to act as a switch in a data plane of a software defined networking (SDN) network, the switch to be communicatively coupled to a controller in a control plane of the SDN network, where the controller is to manage packet processing functionality of the switch, the network device configured to provide data storage resource sharing information to the controller so that the controller can manage data storage resource utilization of the switch, the network device comprising:
a non-transitory machine-readable storage medium having stored therein a data storage resource sharing component; and
a processor communicatively coupled to the non-transitory machine-readable storage medium, the processor configured to execute the data storage resource sharing component, wherein the data storage resource sharing component is configured to determine which tables stored in the switch share a data storage resource of the switch and transmit data storage resource sharing information to the controller, wherein the data storage resource sharing information includes an indication of the tables that share the data storage resource, receive an instruction from the controller to insert one or more entries in a first table from the tables that share the data storage resource, wherein the instruction indicates one or more other tables that share the data storage resource with the first table, and delete one or more entries from the one or more other tables that share the data storage resource with the first table indicated in the instruction in response to a determination that sufficient storage space is not available in the data storage resource for insertion of the one or more entries in the first table.

14. The network device of claim 13, wherein the data storage resource sharing component is further configured to receive instructions from the controller to insert the one or more entries in the first table after deleting the one or more entries from the one or more other tables.

15. A network device to act as a controller in a control plane of a software defined networking (SDN) network, the controller to be communicatively coupled to a switch in a data plane of the SDN network, where the controller is to manage packet processing functionality of the switch, the network device configured to manage data storage resource utilization of the switch, the network device comprising:
a non-transitory machine-readable storage medium having stored therein a data storage resource sharing component; and a processor communicatively coupled to the non-transitory machine-readable storage medium, the processor configured to execute the data storage resource sharing component, wherein the data storage resource sharing component is configured to receive data storage resource sharing information from the switch, wherein the data storage resource sharing information includes an indication of tables stored in the switch that share a data storage resource of the switch and transmit instructions to the switch to insert one or more entries in a first table from the tables that share the data storage resource, together with instructions to delete one or more entries from one or more other tables that share the data storage resource with the first table in an event that sufficient storage space is not available in the data storage resource for insertion of the one or more entries in the first table.

16. The network device of claim 15, wherein the data storage resource sharing information further includes an indication of a minimum number of entries that can be deleted from a second table that shares the data storage resource with the first table to create storage space in the data storage resource for the first table in the event that sufficient storage space is not available in the data storage resource for insertion of an entry in the first table.

17. A non-transitory machine-readable medium having computer code stored therein, which when executed by a set of one or more processors of a network device acting as a switch in a data plane of a software defined networking (SDN) network, causes the network device to perform operations for providing data storage resource sharing information to a controller in a control plane of the SDN network so that the controller can manage data storage resource utilization of the switch, the operations comprising:
 determining which tables stored in the switch share a data storage resource of the switch;
 transmitting data storage resource sharing information to the controller, wherein the data storage resource sharing information includes an indication of the tables that share the data storage resource,
 receiving an instruction from the controller to insert one or more entries in a first table from the tables that share the data storage resource, wherein the instruction indicates one or more other tables that share the data storage resource with the first table; and
 deleting one or more entries from the one or more other tables that share the data storage resource with the first table indicated in the instruction in response to a determination that sufficient storage space is not available in the data storage resource for insertion of the one or more entries in the first table.

18. The non-transitory machine-readable medium of claim 17, wherein the computer code, when executed by the set of one or more processors of the network device, causes the network device to perform further operations comprising:
 inserting the one or more entries in the first table after deleting the one or more entries from the one or more other tables.

19. A non-transitory machine-readable medium having computer code stored therein, which when executed by a set of one or more processors of a network device acting as a controller in a control plane of a software defined networking (SDN) network, causes the network device to perform operations for managing data storage resource utilization of a switch in a data plane of the SDN network, the operations comprising:
 receiving data storage resource sharing information from the switch, wherein the data storage resource sharing information includes an indication of tables stored in the switch that share a data storage resource of the switch; and
 transmitting instructions to the switch to insert one or more entries in a first table from the tables that share the data storage resource, together with instructions to delete one or more entries from one or more other tables that share the data storage resource with the first table in an event that sufficient storage space is not available in the data storage resource for insertion of the one or more entries in the first table.

20. The non-transitory machine-readable medium of claim 19, wherein the data storage resource sharing information further includes an indication of a minimum number of entries that can be deleted from a second table that shares the data storage resource with the first table to create storage space in the data storage resource for the first table in the event that sufficient storage space is not available in the data storage resource for insertion of an entry in the first table.

* * * * *